_US012234735B1_

United States Patent
Micucci et al.

(10) Patent No.: US 12,234,735 B1
(45) Date of Patent: Feb. 25, 2025

(54) CMC BOAS WITH OVERLAPPING SEALS

(71) Applicant: RTX CORPORATION, Farmington, CT (US)

(72) Inventors: Joseph Micucci, Scarbourough, ME (US); Daniel S. Rogers, Lyman, ME (US); Morely S. Sherman, Portsmouth, NH (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/428,397

(22) Filed: Jan. 31, 2024

(51) Int. Cl.
*F01D 11/12* (2006.01)

(52) U.S. Cl.
CPC .......... *F01D 11/12* (2013.01); *F05D 2220/32* (2013.01); *F05D 2240/55* (2013.01); *F05D 2300/6033* (2013.01)

(58) Field of Classification Search
CPC .. F01D 11/12; F05D 2220/32; F05D 2240/55; F05D 2300/6033
See application file for complete search history.

(56) References Cited

U.S. PATENT DOCUMENTS

| | | | |
|---|---|---|---|
| 5,154,577 A * | 10/1992 | Kellock | F01D 11/005 415/134 |
| 9,441,497 B2 | 9/2016 | Bergman et al. | |
| 10,196,913 B1 | 2/2019 | Boeke et al. | |
| 10,633,994 B2 | 4/2020 | Barker | |
| 11,111,794 B2 * | 9/2021 | Bitzko | F01D 25/08 |
| 11,401,830 B2 * | 8/2022 | Ciamarra | F01D 25/246 |
| 2007/0025837 A1* | 2/2007 | Pezzetti, Jr. | F01D 25/246 415/115 |
| 2012/0189424 A1* | 7/2012 | Propheter-Hinckley | F01D 11/005 415/230 |
| 2013/0115065 A1* | 5/2013 | Correia | F01D 9/04 415/182.1 |
| 2019/0040758 A1* | 2/2019 | Quennehen | F01D 9/04 |

* cited by examiner

*Primary Examiner* — David E Sosnowski
*Assistant Examiner* — Theodore C Ribadeneyra
(74) *Attorney, Agent, or Firm* — Carlson, Gaskey & Olds, P.C.

(57) ABSTRACT

A gas turbine engine includes a turbine section that has a seal system disposed in interfaces between adjacent blade outer air seals. The seal system includes a first seal and at least one second seal that partially overlaps the first seal, the at least one second seal is configured to bias the first seal into a sealing position.

13 Claims, 2 Drawing Sheets

CMC BOAS WITH OVERLAPPING SEALS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine according to an example of the present disclosure includes a turbine section that has a first row of vanes disposed about an engine axis, a second row of vanes axially spaced from the first row of vanes, and a row of blades axially between the first row of vanes and the second row of vanes. A row of blade outer air seal arc segments is situated radially outwardly of the row of blades. Each of the blade outer air seal arc segments includes a ceramic matrix composite (CMC) body that defines a core gaspath side facing the row of blades, a non-core gaspath side opposite the core gaspath side, a forward end, an aft end, and circumferential sides. The CMC body has first and second flanges that project from the non-core gaspath side. The blade outer air seal arc segments are arranged such that the circumferential sides of adjacent ones of the blade outer air seal arc segments mate at respective interfaces. A seal system is disposed in each of the interfaces. The seal system includes a first seal and at least one second seal that partially overlaps the first seal. The at least one second seal is configured to bias the first seal into a sealing position.

In a further embodiment of any of the foregoing embodiments, the at least one second seal includes two second seals.

In a further embodiment of any of the foregoing embodiments, each of the two second seals have an L-shape.

In a further embodiment of any of the foregoing embodiments, the L-shape includes first and second legs that meet at a corner. The first leg overlaps and contacts the first seal, and the second leg extends away from the first seal.

In a further embodiment of any of the foregoing embodiments, the first legs of the two second seals are of unequal length.

In a further embodiment of any of the foregoing embodiments, the second legs of the two second seals are of equal length.

In a further embodiment of any of the foregoing embodiments, the first leg of one of the two seals is forwardly-extending and the first leg of the other of the two seals is aftly-extending.

In a further embodiment of any of the foregoing embodiments, the second legs of the two second seals extend radially along the first and second flanges.

In a further embodiment of any of the foregoing embodiments, the L-shape of one of the two second seals has a 90° angle, and the L-shape of the other of the two second seals has a greater than 90° angle.

In a further embodiment of any of the foregoing embodiments, the two second seals are non-contacting with each other.

In a further embodiment of any of the foregoing embodiments, the first seal and the at least one second seal are feather seals.

In a further embodiment of any of the foregoing embodiments, there is a pressure differential across the at least one second seal to bias the first seal into the sealing position.

A further embodiment of any of the foregoing embodiments includes a compressor section and a combustor in fluid communication with the compressor section.

In a further embodiment of any of the foregoing embodiments, the first seal and the at least one second seal are disposed in grooves in the circumferential sides of the blade outer air seal arc segments.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
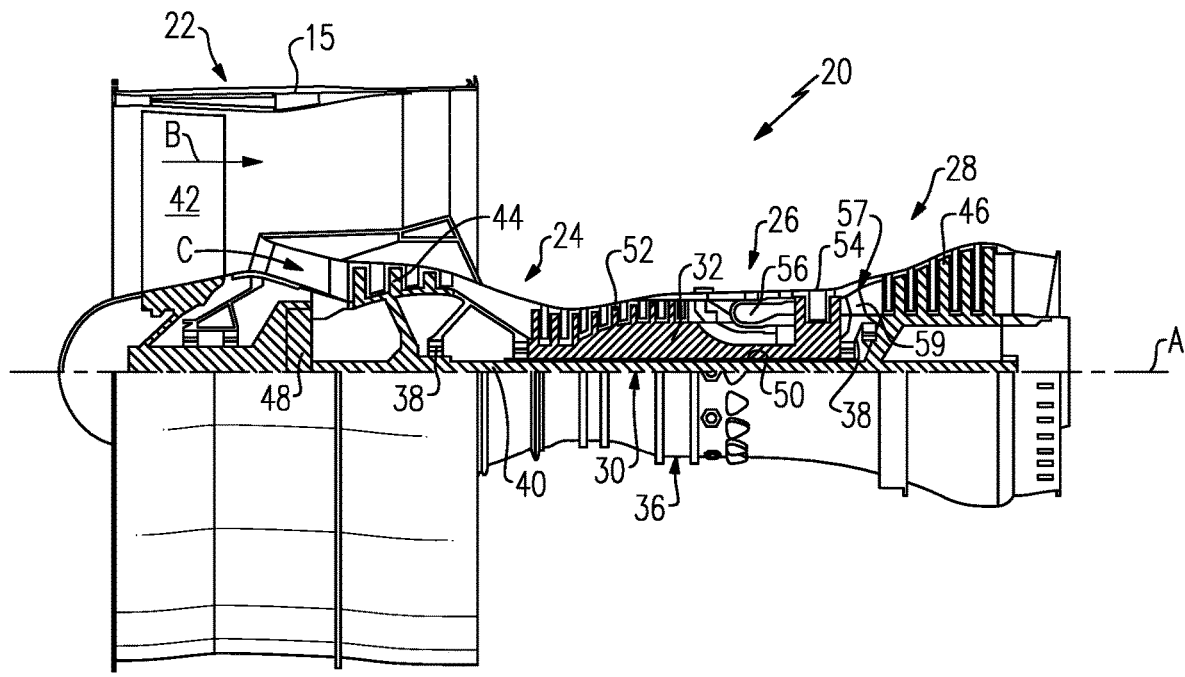
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
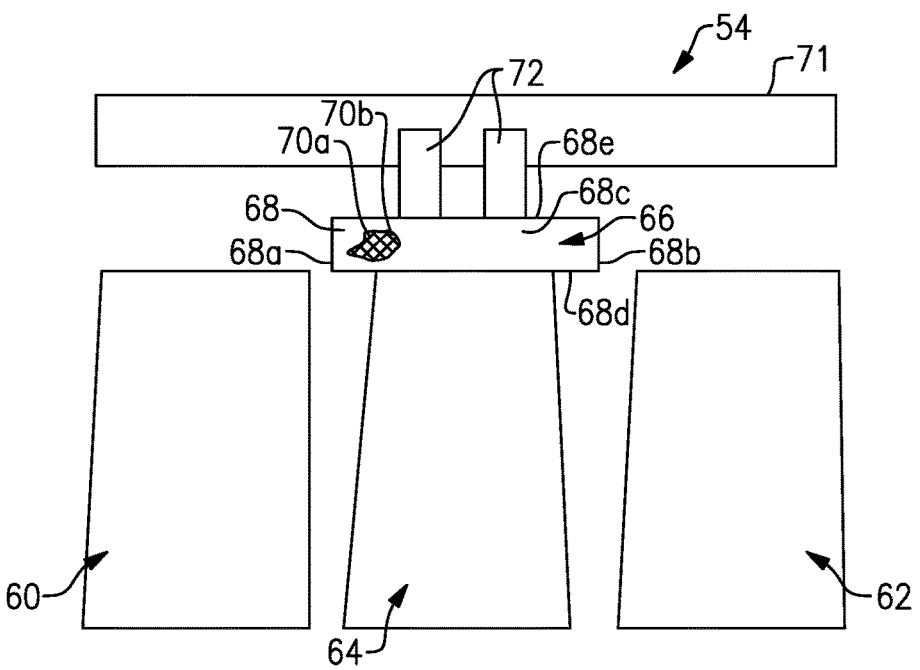
FIG. 2 illustrates a turbine section of the engine.

FIG. 2 illustrates a portion of the high pressure turbine 54. This section of the turbine 54 includes a first row of vanes 60 and a second row of vanes 62 axially spaced from the first row of vanes 60. There is a row of rotatable blades 64 axially between the first row of vanes 60 and the second row of vanes 62. A row of blade outer air seal ("BOAS") arc segments 66 is located axially between the first row of vanes 60 and the second row of vanes 62. The BOAS 66 are arc segments in that they each are arced about the engine central axis A.

Each BOAS arc segment 66 is situated radially outwardly of the row of blades 64 and is comprised of a ceramic matrix composite body 68 ("CMC body 68"). A CMC material is comprised of ceramic fiber plies 70a in a ceramic matrix 70b. Example ceramic matrices are silicon-containing ceramic, such as but not limited to, a silicon carbide (SiC) matrix or a silicon nitride (Si3N4) matrix. Ceramic fibers are formed of bundles of filaments and may include, but are not limited to, silicon carbide (SiC) fibers or silicon nitride (Si3N4) fibers. The CMC may be, but is not limited to, a SiC/SiC ceramic matrix composite in which SiC fiber plies are disposed within a SiC matrix.

The CMC body 68 defines a forward end 68a, an aft end 68b, circumferential sides 68c, a core gaspath side 68d facing the row of blades 64, and a non-core gaspath side 68e opposite the core gaspath side 68d. There is a pair of flanges 72 that project radially from the non-core gaspath side 68e. The flanges 72 are not limited to, but may serve for, mounting the BOAS arc segment 68 to a case 71 in the engine 20, such as in a pinned clevis joint or hook-type attachment. In the illustrated example, the flanges 72 are substantially radially-oriented but at least one of the flanges 72 has a draft angle that facilitates de-molding during manufacturing. For instance, the forward (left) flange is perpendicular to the engine axis A, but the aft flange 72 is slightly slanted away from the other flange 72 at an angle of greater than 90°, such as approximately 92°.

Figure 3:
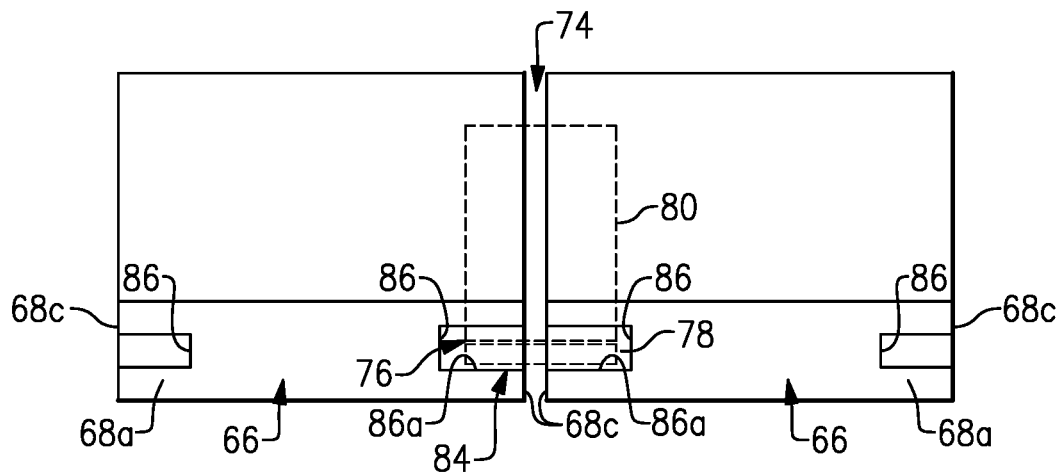
FIG. 3 illustrates an interface and seal system between adjacent BOAS arc segments.

As shown in FIG. 3, the BOAS segments 66 are arranged such that the circumferential sides of adjacent ones of the BOAS segments 66 mate at respective interfaces 74. There is a gap in the interface 74. A seal system 76 is disposed in each of the interfaces 74 and serves to block flow of hot gases from the core gaspath into regions behind the BOAS arc segments 66. The seal system 76 includes a first seal 78 and at least one second seal 80 that partially overlaps the first seal 78. For instance, the seals 78/80 are feather seals that are formed of elongated ribbons of metal, such as a cobalt superalloy. The at least one second seal 80 is configured to bias the first seal 78 into a sealing position. For example, the at least one second seal 80 includes a portion that is in facial contact with and extends along the first seal 78. The facial contact is between the radially outer broadside face of the first seal 78 and a radially inner broadside face of the second seal 80. The second seal 80 is configured to bias the first seal 78 in that there is a high pressure region (HP) radially outwards of the seals 78/80 that acts to exert a force on the second seal 80 against the first seal 78.

The first seal 78 is disposed in a seal slot 84 that is formed by grooves 86 in each of the faces of the circumferential sides 68c. The grooves 86 open toward each other such that the first seal 78 bridges the gap and portions of the first seal 78 reside in each groove 86. Each groove 86 defines a radially inner surface 86a against which the first seal 78 is biased to provide sealing. Thus, in the sealed position the first seal 78 is in contact with the surface 86a to substantially block flow through the gap.

Figure 4:
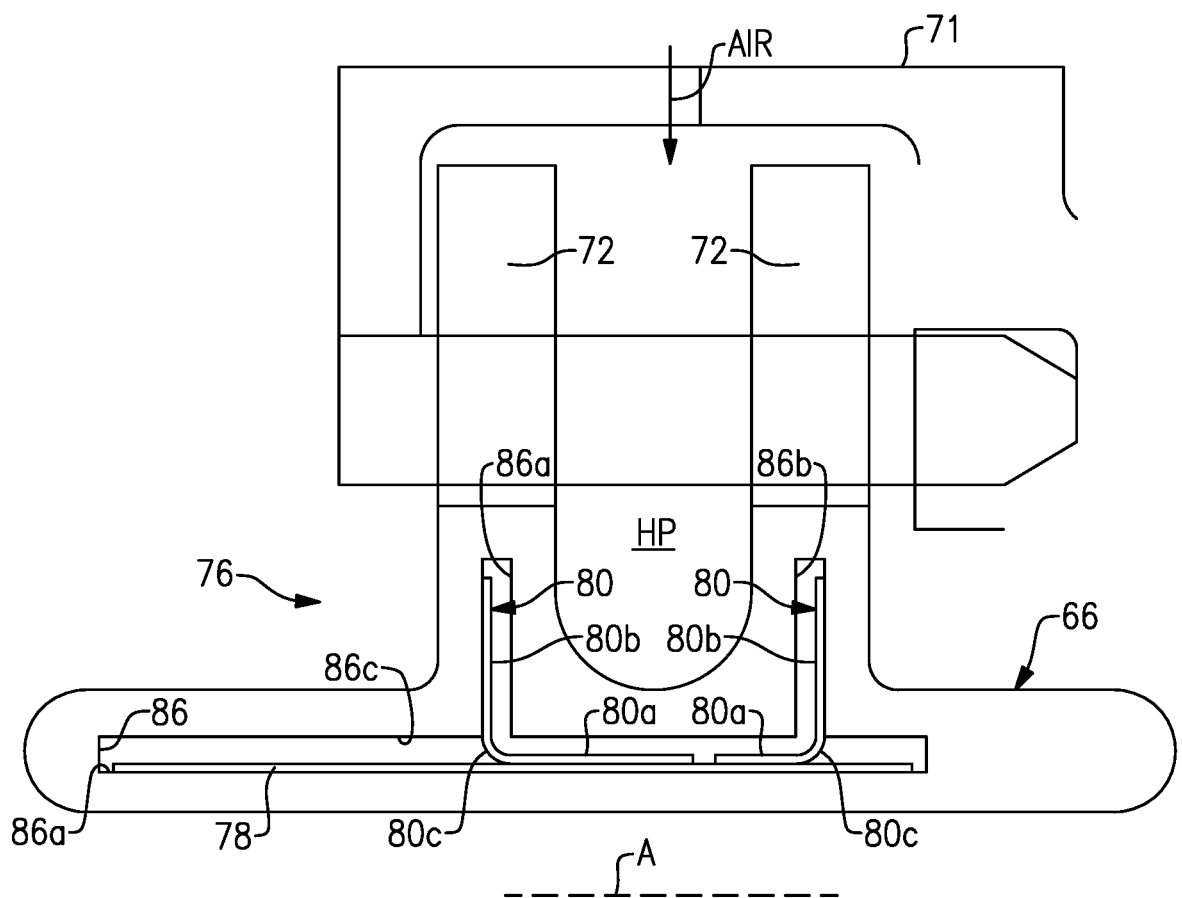
FIG. 4 illustrates an example of a seal system.

In the view of the seal system 76 in FIG. 4 there are two second seals 80. Each of the two second seals 80 has an L-shape that includes first and second legs 80a/80b that meet at a corner 80c. The legs 80a/80b of the seal 80 on the left are oriented at a 90° angle to each other, while the legs 80a/80b of the seal 80 on the right are oriented at an angle of greater than 90° to each other, such as approximately 92°, commensurate with the 92° angle of that flange 72. The first leg 80a overlaps and contacts the first seal 78, and the second leg 80b radially extends away from the first seal 78. In this regard, the groove 86 is branched and includes two radial groove sections 86a/86b that extend radially from an axial groove section 86c and along the respective flanges 72. The second legs 80b of the second seals 80 extend in the respective radial groove sections 86a/86b, while the first legs 80a extend in the axial groove section 86c along the first seal 78.

Pressurized air, such as bleed air from the compressor section 24, is provided in the HP region and creates a pressure differential across the seals 80 to bias the second seals 80 radially inwardly against the first seal 78 to urge the first seal 78 into the sealing position.

As shown, the first legs 80a of the two second seals 80 are of unequal (axial) length, while the second legs 80b of the two second seals 80 are of equal (radial) length. The unequal lengths of the first legs 80a facilitates mistake-proofing the assembly of the seals 80, while the equal lengths of the second legs 80b facilitates sealing uniformity radially along the radial groove sections 86b. Additionally, the first leg 80a of one of the two seals 80 is forwardly-extending and the first leg 80a of the other of the two seals 80 is aftly-extending (in the illustrated example, the BOAS arc segment 66 is oriented such that the core gaspath flow is from left-to-right in the figure, making the left side of the figure forward and the right side aftward). The seals 80, however, are non-contacting, as neither of the legs 80a are long enough to touch each other, which avoids the seals 80 from interfering with movement of each other.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
a turbine section including,
a first row of vanes disposed about an engine axis, a second row of vanes axially spaced from the first row of vanes, and a row of blades axially between the first row of vanes and the second row of vanes;
a row of blade outer air seal arc segments situated radially outwardly of the row of blades, each of the blade outer air seal arc segments including a ceramic matrix composite (CMC) body defining a core gaspath side facing the row of blades, a non-core gaspath side opposite the core gaspath side, a forward end, an aft end, and circumferential sides, the CMC body having first and second flanges projecting from the non-core gaspath side, the blade outer air seal arc segments being arranged such that the circumferential sides of adjacent ones of the blade outer air seal arc segments mate at respective interfaces; and
a seal system disposed in each of the interfaces, the seal system including a first seal and at least one second seal that partially overlaps the first seal, the at least one second seal configured to bias the first seal into a sealing position, and the at least one second seal includes two second seals, each of the two second seals having an L-shape, the L-shape including first and second legs that meet at a corner, the first leg overlapping and contacting the first seal, and the second leg extending away from the first seal, and the first legs of the two second seals are of unequal length.

2. The engine as recited in claim 1, wherein the second legs of the two second seals are of equal length.

3. The engine as recited in claim 1, wherein the first leg of one of the two second seals is forwardly-extending and the first leg of the other of the two second seals is aftly-extending.

4. The engine as recited in claim 1, wherein the second legs of the two second seals extend radially along the first and second flanges.

5. The engine as recited in claim 1, wherein the L-shape of one of the two second seals has a 90° angle, and the L-shape of the other of the two second seals has a greater than 90° angle.

6. The engine as recited in claim 1, wherein the two second seals are non-contacting with each other.

7. The engine as recited in claim 1, wherein the first seal and the at least one second seal are feather seals.

8. The engine as recited in claim 1, wherein there is a pressure differential across the at least one second seal to bias the first seal into the sealing position.

9. The engine as recited in claim 1, further comprising a compressor section and a combustor in fluid communication with the compressor section.

10. The engine as recited in claim 1, wherein the first seal and the at least one second seal are disposed in grooves in the circumferential sides of the blade outer air seal arc segments.

11. A gas turbine engine comprising:
a turbine section including,
a first row of vanes disposed about an engine axis, a second row of vanes axially spaced from the first row of vanes, and a row of blades axially between the first row of vanes and the second row of vanes;
a row of blade outer air seal arc segments situated radially outwardly of the row of blades, each of the blade outer air seal arc segments including a ceramic matrix composite (CMC) body defining a core gaspath side facing the row of blades, a non-core gaspath side opposite the core gaspath side, a forward end, an aft end, and circumferential sides, the CMC body having first and second flanges projecting from the non-core gaspath side, the blade outer air seal arc segments being arranged such that the circumferential sides of adjacent ones of the blade outer air seal arc segments mate at respective interfaces; and a seal system disposed in each of the interfaces, the seal system including a first seal and at least one second seal that partially overlaps the first seal, the at least one second seal configured to bias the first seal into a sealing position, and the at least one second seal includes two second seals, each of the two second seals having an L-shape, the L-shape including first and second legs that meet at a corner, the first leg overlapping and contacting the first seal, and the second leg extending away from the first seal, the L-shape of one of the two second seals having a 90° angle, and the L-shape of the other of the two second seals having a greater than 90° angle.

12. The engine as recited in claim 11, wherein the first legs of the two second seals are of unequal length.

13. The engine as recited in claim 12, wherein the second legs of the two second seals are of equal length.

* * * * *